United States Patent
Burns et al.

(10) Patent No.: US 6,520,576 B1
(45) Date of Patent: Feb. 18, 2003

(54) VEHICLE ARMRESTS WITH REMOVABLE BEVERAGE CONTAINER HOLDERS

(75) Inventors: Patrick M. Burns, Dearborn, MI (US); Duncan M. Carswell, Shelby Township, MI (US); Jim Gammon, Troy, MI (US); Jeffrey Schultz, Grand Ledge, MI (US); Edward R. Terris, East Lansing, MI (US)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 09/971,546

(22) Filed: Oct. 4, 2001

(51) Int. Cl.$^7$ ................................................. A47C 7/62
(52) U.S. Cl. ........................... 297/188.14; 297/188.16; 297/188.15; 297/188.18; 248/311.2
(58) Field of Search ........................ 297/188.14, 188.15, 297/188.18, 188.2, 411.32, 411.3, 188.16, 188.17; 248/311.2, 222.51; 403/348, 349

(56) References Cited

U.S. PATENT DOCUMENTS

| 1,915,958 | A |   | 6/1933 | Skirrow |
|---|---|---|---|---|
| 2,518,538 | A |   | 8/1950 | Giblin |
| 2,698,155 | A |   | 12/1954 | Bowman |
| 2,926,879 | A |   | 3/1960 | Dietrich |
| 3,842,981 | A |   | 10/1974 | Lambert |
| 4,535,923 | A |   | 8/1985 | Manke |
| 4,749,112 | A |   | 6/1988 | Harper |
| 4,779,831 | A |   | 10/1988 | Anderson |
| 4,844,400 | A |   | 7/1989 | Jasmagy, Jr. |
| 4,852,843 | A |   | 8/1989 | Chandler |
| 4,877,164 | A |   | 10/1989 | Baucom |
| 5,014,956 | A |   | 5/1991 | Kayali |
| 5,048,733 | A |   | 9/1991 | Nagy |
| 5,106,046 | A |   | 4/1992 | Rowles et al. |
| 5,238,212 | A | * | 8/1993 | Dechellis ................. 248/311.2 |
| 5,271,661 | A | * | 12/1993 | Gould et al. ........... 297/188.15 |
| 5,295,650 | A | * | 3/1994 | Brandt ..................... 248/311.2 |
| 5,320,406 | A | * | 6/1994 | North ..................... 297/188.14 |
| 5,489,055 | A |   | 2/1996 | Levy |
| 5,603,477 | A |   | 2/1997 | Deutsch |
| 5,791,616 | A | * | 8/1998 | Volkmann et al. ........ 248/311.2 |
| 5,800,011 | A | * | 9/1998 | Spykerman ............ 297/188.19 |
| 5,938,160 | A |   | 8/1999 | Hartmann et al. |
| 6,095,471 | A |   | 8/2000 | Huang |
| 6,186,382 | B1 |   | 2/2001 | Bergin et al. |
| 6,227,511 | B1 | * | 5/2001 | De Costa ................. 248/311.2 |
| 6,318,689 | B1 | * | 11/2001 | Rodriguez ............... 248/311.2 |
| 6,361,105 | B1 | * | 3/2002 | Turner et al. ................. 297/23 |

* cited by examiner

Primary Examiner—Milton Nelson, Jr.
Assistant Examiner—Erika Garrett
(74) Attorney, Agent, or Firm—Myers Bigel Sibley & Sajovec

(57) ABSTRACT

Vehicle armrests configured to removably receive beverage container holders are provided. Armrests are configured to removably receive beverage container holders in end portions and/or intermediate portions thereof. Armrests pivotally mounted within passenger compartments of vehicles can be restrained from pivotal movement when beverage container holders are removably secured thereto.

18 Claims, 11 Drawing Sheets

# VEHICLE ARMRESTS WITH REMOVABLE BEVERAGE CONTAINER HOLDERS

FIELD OF THE INVENTION

The present invention relates generally to beverage container holders and, more particularly, to beverage container holders utilized within vehicles.

BACKGROUND OF THE INVENTION

Passenger seats in vehicles, such as automobiles, trains, boats, and airplanes, often include armrests for the comfort of vehicle occupants. Typically, armrests are attached to a side portion of a vehicle seat back and may be configured to pivot between a raised position and a lowered position. In a raised position, an armrest typically is aligned vertically with the seat back; in a lowered position, an armrest typically extends horizontally outwardly from the seat back to provide support for the arm of an occupant.

It is generally considered desirable to provide one or more beverage container holders within vehicles for the convenience of vehicle occupants. Various types of beverage container holders for use within vehicles are disclosed, for example, within U.S. Pat. Nos. 1,915,958; 2,518,538; 2,698,155; 2,926,879; 3,842,981; 4,535,923; 4,749,112; 4,779,831; 4,844,400; 4,852,843; 4,877,164; 5,014,956; 5,048,733; 5,106,046; 5,489,055; 5,603,477; 5,938,160; and 6,095,471.

With respect to automobiles, various known beverage container holders are constructed to hook over a window or door. Others are constructed with a clamping device which is adapted to be fitted to a dashboard or glove box cover. Some require that a mounting base be secured to a dashboard or other mounting surface, such as by fasteners, adhesive, vacuum cups, or the like.

Ergonomically, it is considered desirable to attach beverage container holders to the armrests of vehicle seats. Unfortunately, when not in use, beverage container holders attached to vehicle seat armrests can be bulky and cumbersome. In addition, the contents of a beverage container may spill if an armrest supporting the beverage container within a holder attached thereto is inadvertently moved to a raised position by a vehicle occupant.

SUMMARY OF THE INVENTION

In view of the above discussion, armrests for use within vehicle passenger compartments are configured to removably receive beverage container holders. According to embodiments of the present invention, armrests are configured to removably receive beverage container holders in end portions thereof. According to other embodiments of the present invention, armrests are configured to removably receive beverage container holders in intermediate portions thereof. According to additional embodiments of the present invention, armrests pivotally mounted within passenger compartments can be restrained from pivotal movement when beverage container holders are removably secured thereto.

Armrest assemblies according to embodiments of the present invention are ergonomically advantageous because beverage container holders can be positioned in convenient locations for vehicle passengers. Moreover, beverage container holders according to embodiments of the present invention can be easily removed when not needed. In addition, armrest assemblies according to embodiments of the present invention can be advantageous in that potential beverage spills caused by armrest movement can be prevented.

BRIEF DESCRIPTION OF THE DRAWINGS

The accompanying drawings, which form a part of the specification, illustrate key embodiments of the present invention. The drawings and description together serve to fully explain the invention.

FIG. 2A is an enlarged perspective view of the end portion of the armrest of FIG. 2 illustrating the beverage container holder in an installed position.

FIGS. 8A–8B are perspective views of an armrest assembly according to embodiments of the present invention, wherein a beverage container holder is configured to be removably attached to an armrest end portion and to prevent the armrest from being moved to a raised position.

FIGS. 9A–9B are enlarged perspective views of the end portion of the armrest of FIG. 8 illustrating the male member of the beverage container holder in a first orientation for insertion into the female member of the armrest (FIG. 9A) and illustrating the male member locked into place upon rotating the beverage container holder after insertion into the female member (FIG. 9B).

DETAILED DESCRIPTION OF THE INVENTION

Figure 1:
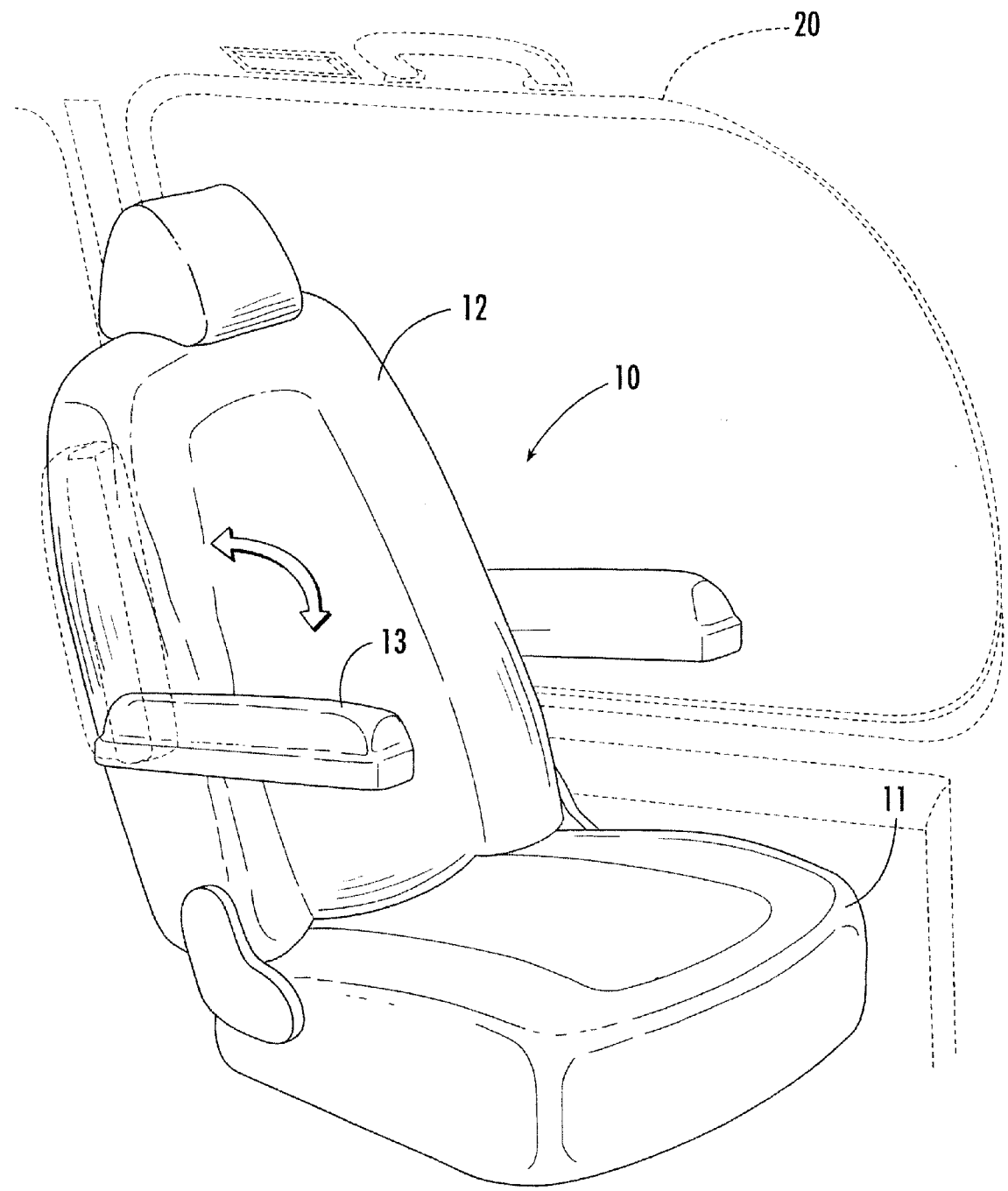
FIG. 1 is a perspective view of a conventional vehicle seat having an armrest pivotally attached thereto and illustrating armrest movement between lowered and raised positions.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Referring initially to FIG. 1, a seat of the type suitable for vehicle use and within which an armrest assembly according to embodiments of the present invention may be utilized is indicated as 10. The illustrated seat 10 may be installed in a vehicle 20 (e.g., automobile, train, watercraft, aircraft, etc.) in a conventional manner and includes a seat bottom 11 and a seat back 12. An armrest 13 is pivotally attached to the seat back 12 and is configured to pivot with respect to the seat back 12 between a raised position and a lowered position. In the raised position, the armrest 13 is pivoted so that it is substantially vertically aligned with the seat back 12. In the lowered position, the armrest 13 extends generally outwardly from the seat back 12 so that an occupant can rest his/her arm thereon.

Figure 2:
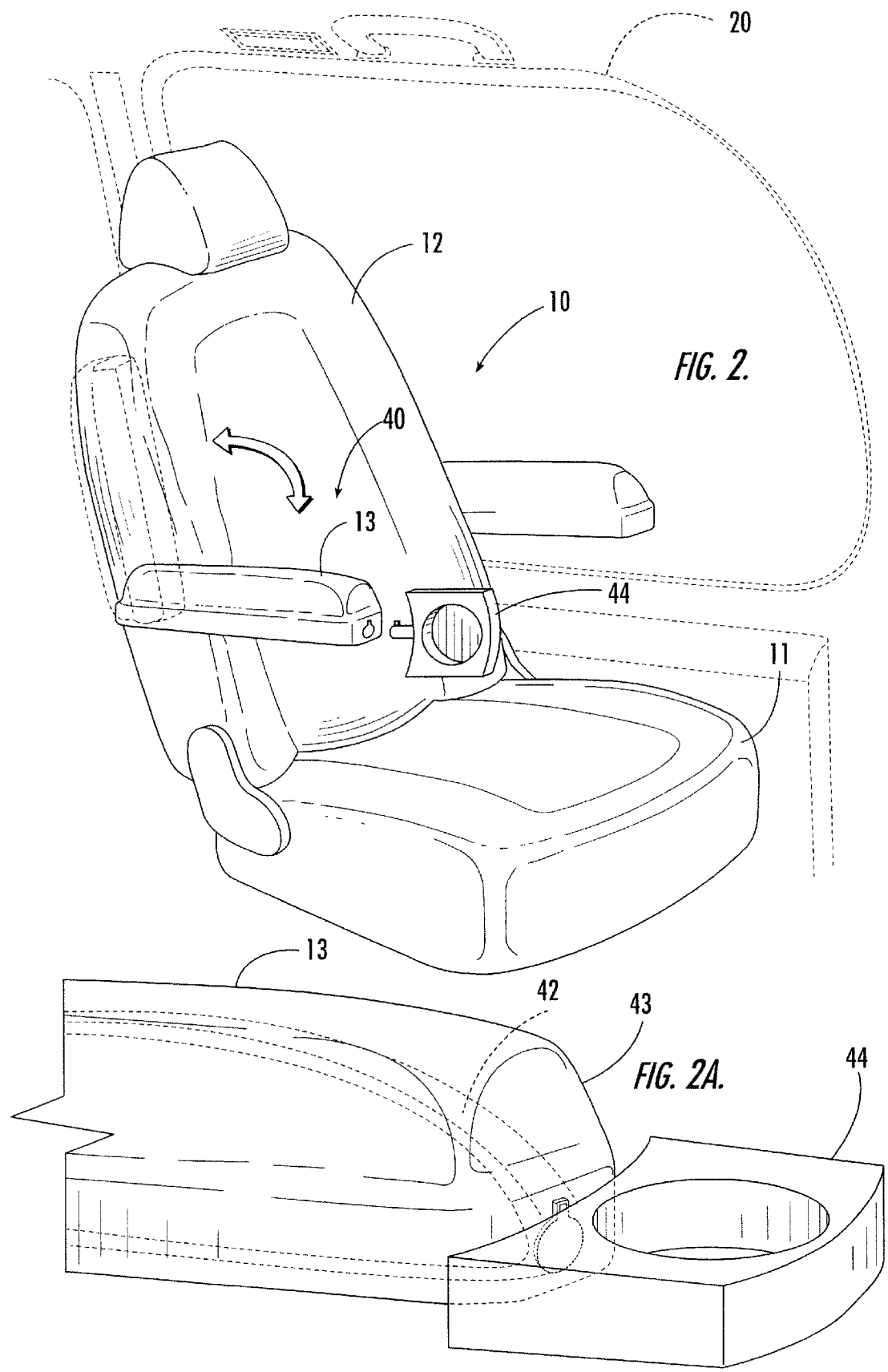
FIG. 2 is a perspective view of a vehicle seat having an armrest assembly with a removable beverage container holder configured to be removably attached to the armrest end portion, according to embodiments of the present invention.
Figure 3:
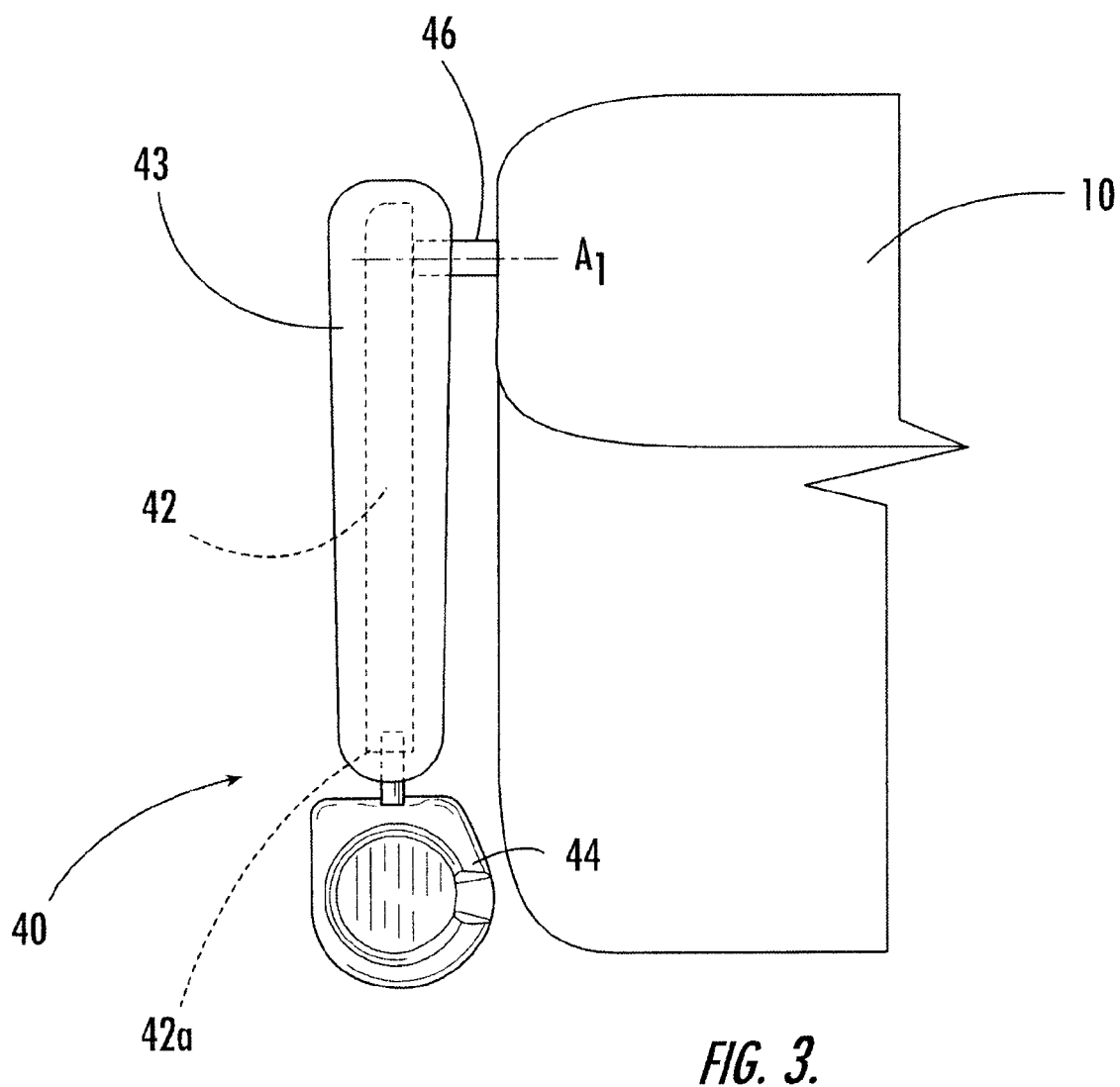
FIG. 3 is a top plan view of the armrest assembly of FIG. 2A.

Referring now to FIGS. 2–2A and 3, the seat 10 of FIG. 1 is illustrated with an armrest assembly 40, according to embodiments of the present invention, pivotally attached thereto. The illustrated armrest assembly 40 includes an armrest 13 having a substantially rigid, elongated frame 42 covered with upholstery 43 (FIG. 2A), and a beverage container holder 44 removably secured to the frame 42. The elongated frame 42 is pivotally secured to the seat 10 via a mounting pin 46 (FIG. 3) that extends between the elongated frame 42 and the seat 10. The mounting pin 46 is secured to the elongated frame 42 and to the seat 10 such that the frame 42 (and armrest 13) can be pivoted about axis $A_1$ such that armrest 13 can be moved between raised and lowered positions relative to the seat 10 (FIG. 2). The mounting pin 46 may be secured to the elongated frame 42 and the seat 10 in various ways without limitation.

Figure 4:
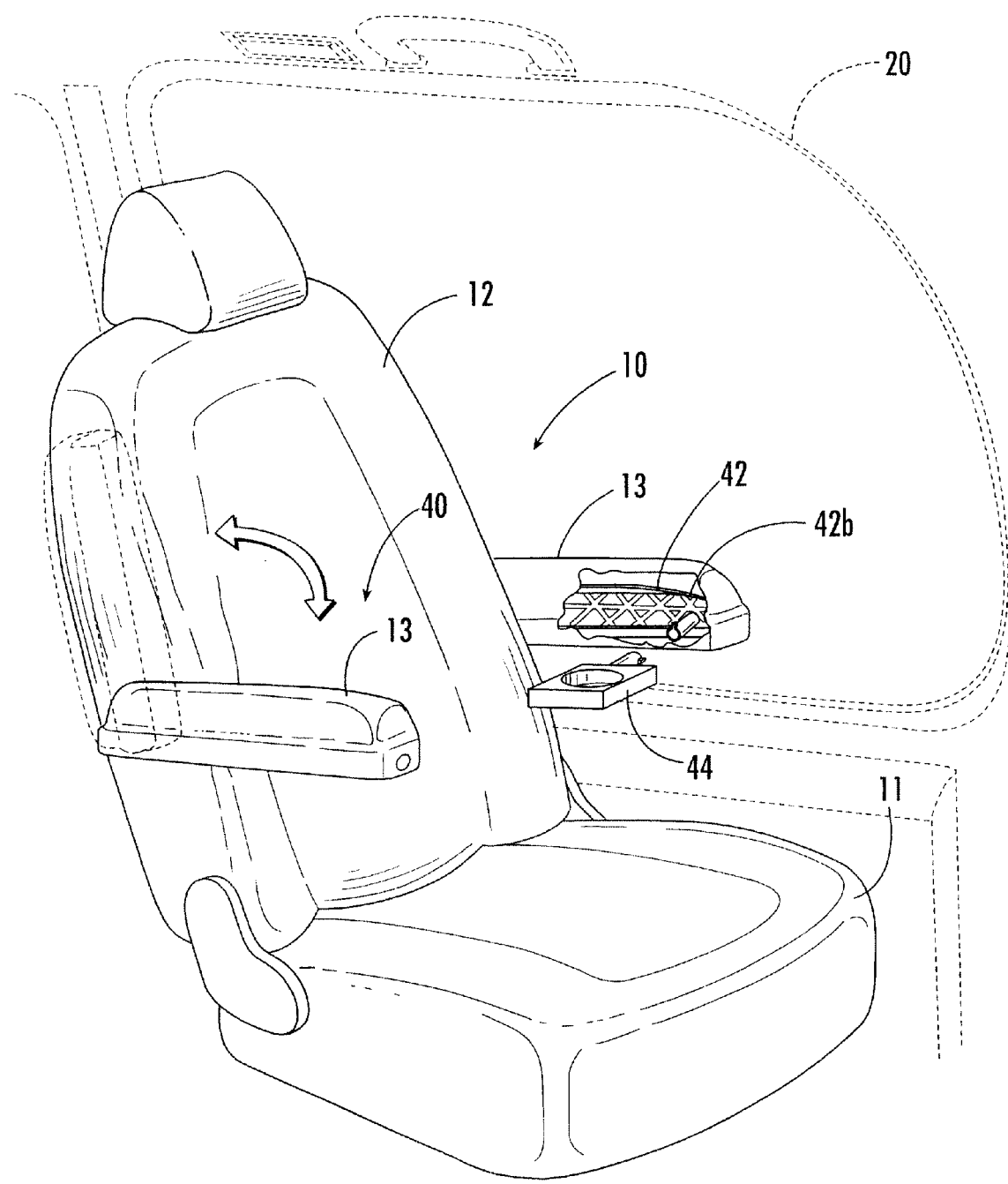
FIG. 4 is a perspective view of a vehicle seat having an armrest assembly with a removable beverage container holder attached to an armrest intermediate portion according to embodiments of the present invention.
Figure 5A:
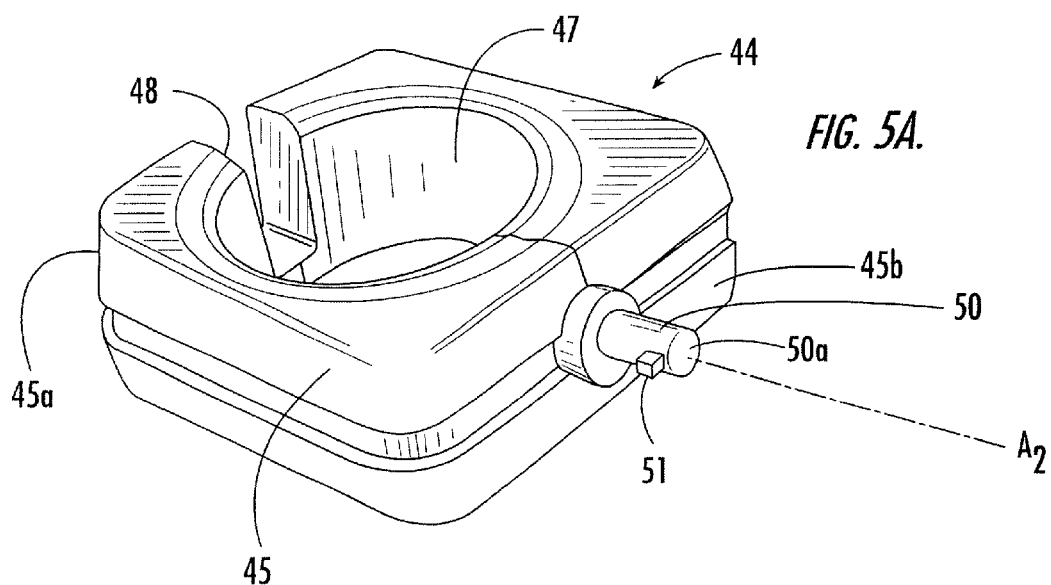
FIG. 5A is an enlarged perspective view of the beverage container holder of FIGS. 2–4.
Figure 5B:
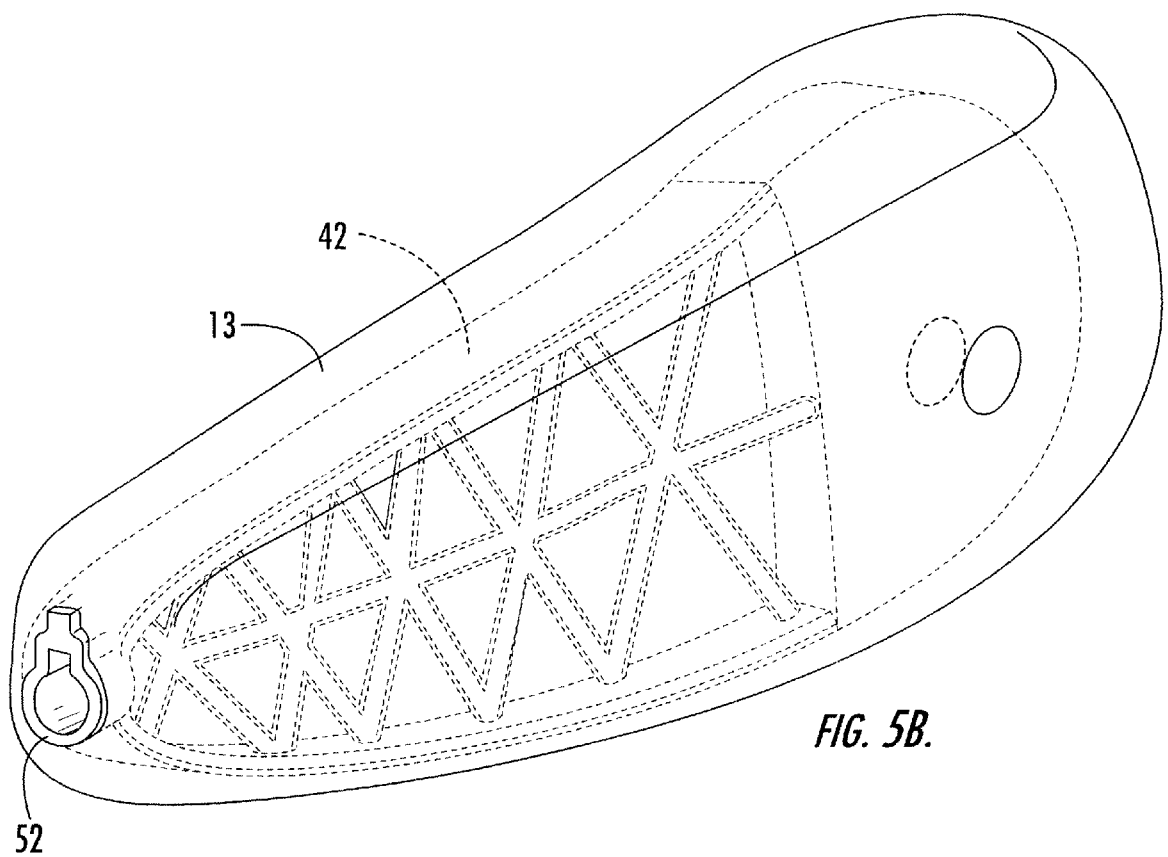
FIG. 5B is an enlarged perspective view of the armrest of FIGS. 2–4 illustrating a female connector in the end of the armrest that is configured to removably receive the male connector of the beverage container holder.

The beverage container holder 44 is removably secured to an end 42a of the elongated frame 42, as illustrated in FIG. 3. According to alternative embodiments of the present invention, the beverage container holder 44 may be removably secured to an intermediate portion 42b of the elongated frame 42, as illustrated in FIG. 4 and in FIGS. 7A–7B.

Referring to FIGS. 5A–5B and 6A–6B, the illustrated beverage container holder 44 includes a body 45 having a receptacle 47 that is configured to receive and support a beverage container therein. A slot 48 is formed within wall 45a of the illustrated body 45. A male connector 50 extends outwardly from an opposite wall 45b of the body 45, as illustrated. The illustrated male connector 50 has a generally "bayonet-shaped" configuration with a member 51 extending radially outward from a distal end 50a of the male member 50. Embodiments of the present invention are not limited to the illustrated beverage container holder 44. Beverage container holders having various shapes, sizes and configurations may be utilized without limitation.

Figure 6A:
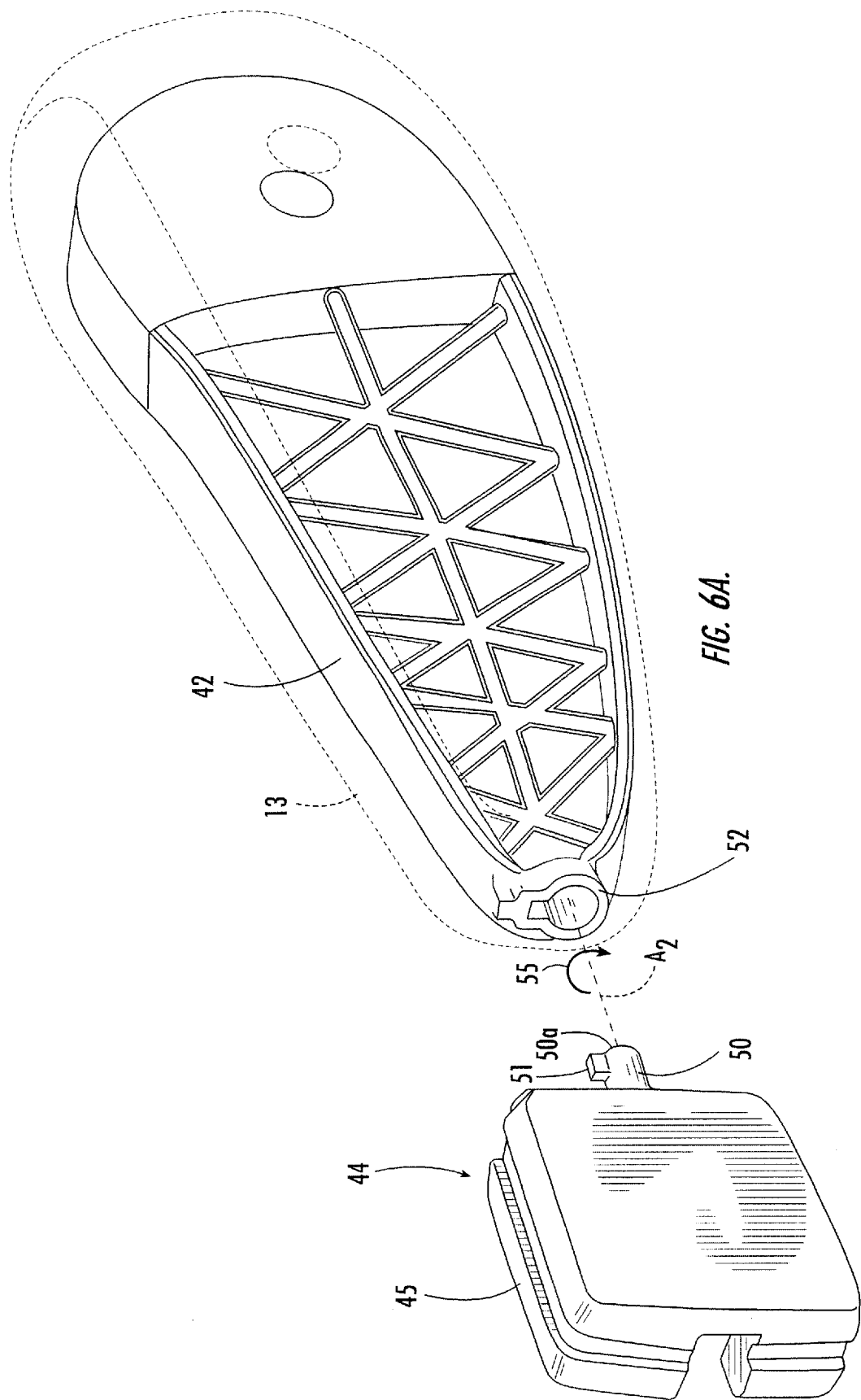
FIG. 6A illustrates the beverage container holder of FIG. 5A in a first orientation for insertion of the male member thereof into the female member in the armrest end portion of FIG. 5B.
Figure 6B:
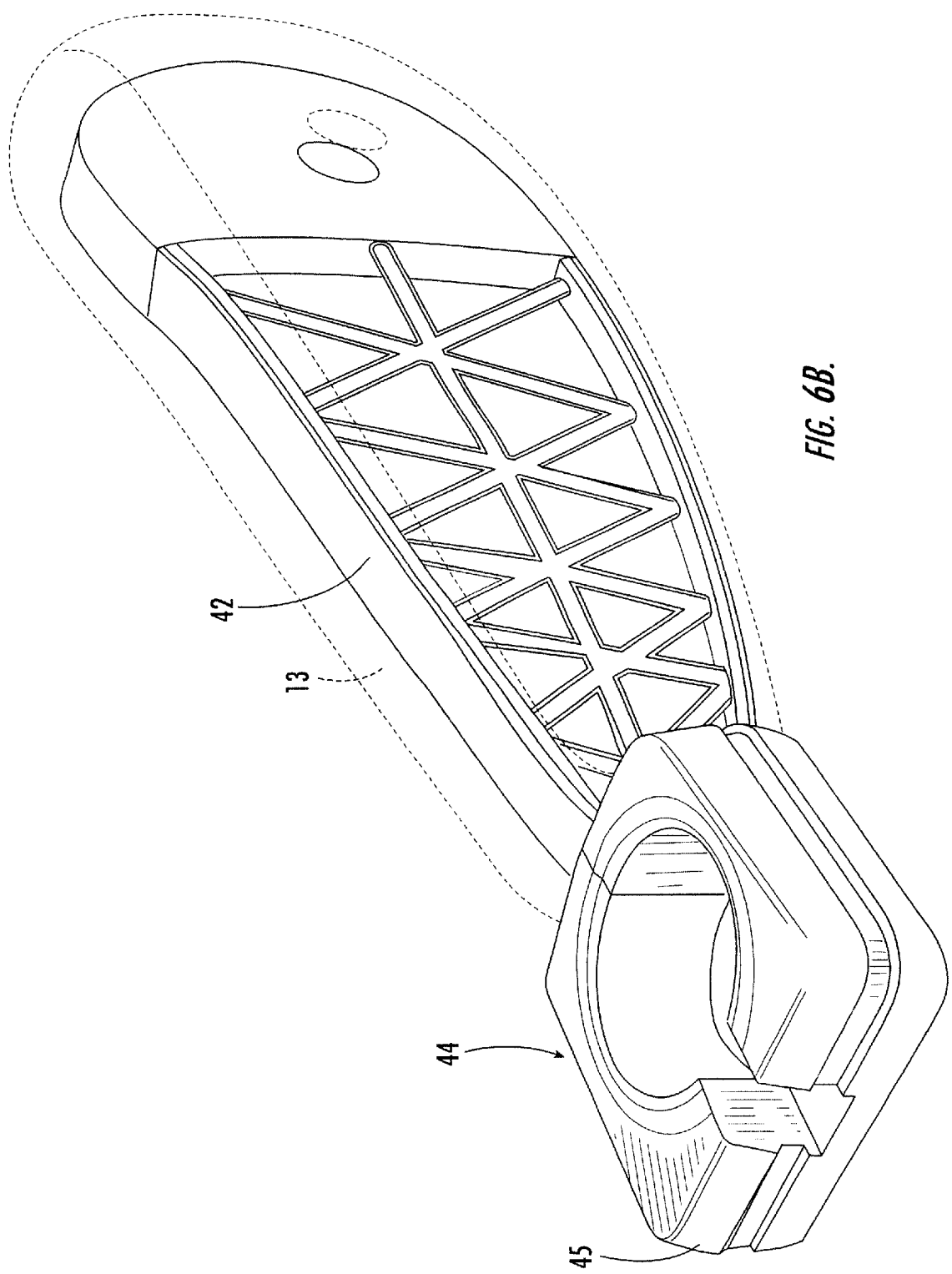
FIG. 6B illustrates the beverage container holder of FIG. 5A locked into place upon rotating the beverage container holder after insertion of the male member into the female member in the armrest end portion of FIG. 5B.

The illustrated armrest frame 42 has a female connector 52 (FIG. 5B) formed in the end 42a thereof that is configured to removably receive the male connector 50 of the beverage container holder 44 in locking relationship. The illustrated female connector 52 has a generally keyhole-shaped configuration. The female connector 52 is configured to allow the male connector 50 to be rotated about an axis $A_2$ thereof to a locked position, indicated by arrow 55 (FIG. 6A). FIG. 6A illustrates the beverage container holder 44 in a first orientation for insertion of the male member 50 into the female member 52. FIG. 6B illustrates the beverage container holder 44 locked into place upon rotating the beverage container holder 44 about axis $A_2$ after insertion of the male member 50 into the female member 52.

Figure 7A:
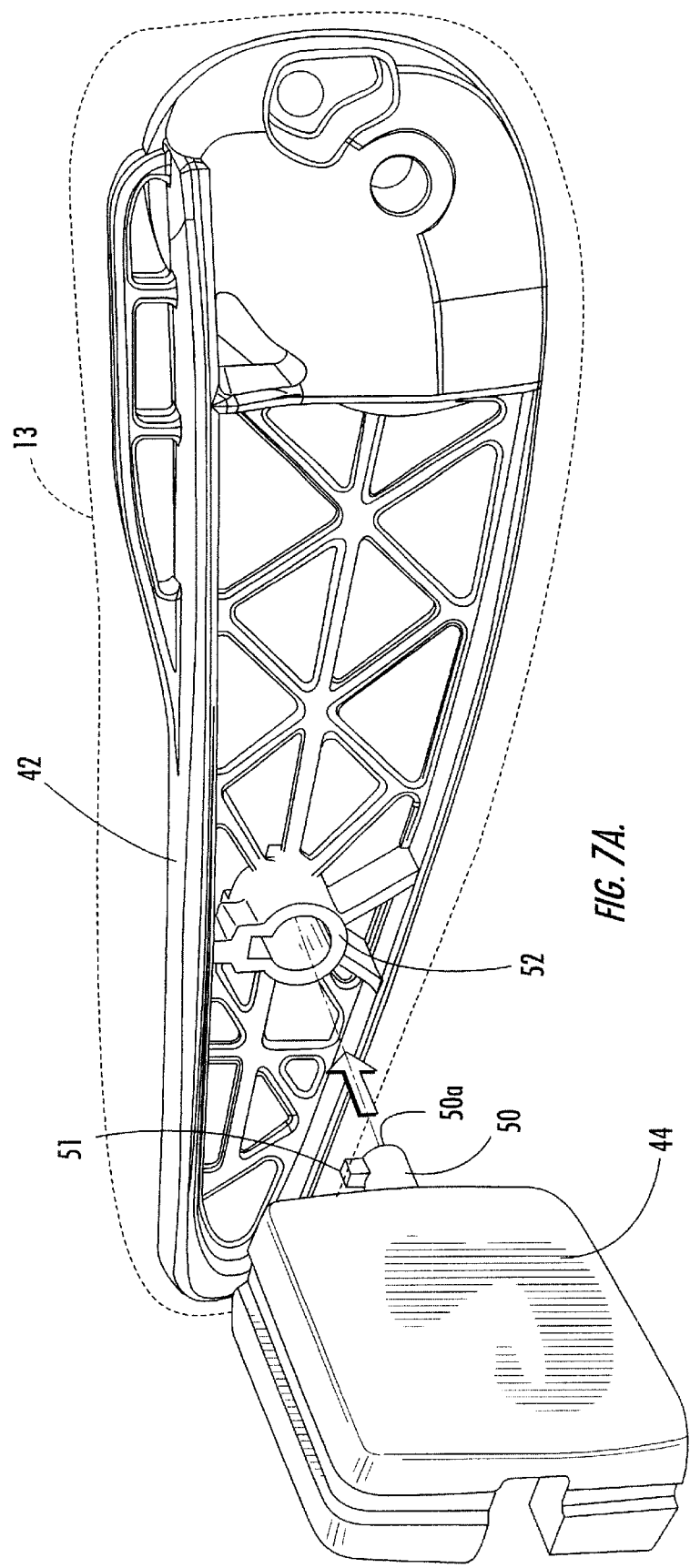
FIG. 7A illustrates the beverage container holder of FIG. 5A in a first orientation for insertion of the male member thereof into a female member in an intermediate portion of an armrest according to embodiments of the present invention.
Figure 7B:
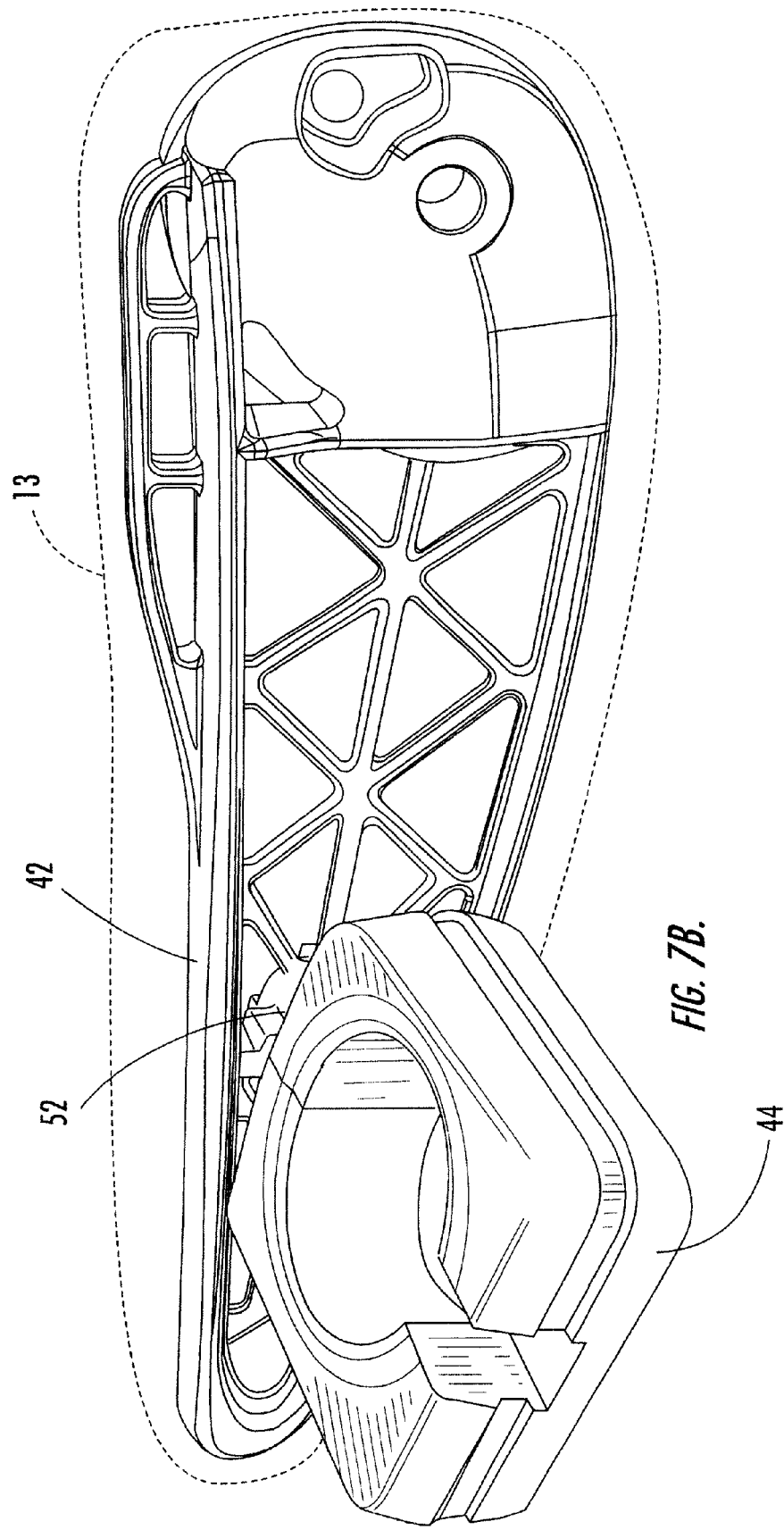
FIG. 7B illustrates the beverage container holder of FIG. 7A locked into place upon rotating the beverage container holder after insertion of the male member into the female member in the armrest intermediate portion.

Another embodiment of the present invention wherein a beverage container holder 44 is removably secured to an intermediate portion 42b of an armrest frame 42 is illustrated in FIGS. 7A–7B. FIG. 7A illustrates the beverage container holder 44 in a first orientation for insertion of the male member 50 into the female member 52. FIG. 7B illustrates the beverage container holder 44 locked into place upon rotating the beverage container holder 44 after insertion of the male member 50 into the female member 52.

Referring to FIGS. 8A–8B, 9A–9B, and 10, an armrest assembly 140 wherein pivotal movement of,the armrest 13 is prevented when a beverage container holder 44 is removably secured to the armrest is illustrated. The armrest 13 is pivotally secured to a seat (not shown) as described above via mounting pin 46 and is configured to pivot between a raised position and a lowered position. The illustrated mounting pin 46 includes a slotted portion 46a. An elongated member 150 (e.g., a rod) having opposite first and second ends 150a, 150b is movably secured to the elongated frame 42 within the armrest 13 and is moveable along the longitudinal extent of the frame 42 between first and second positions. The elongated member 150 may have various shapes and/or configurations and is not limited to the illustrated embodiment.

Figures 8A, 8B, 9A, 9B:
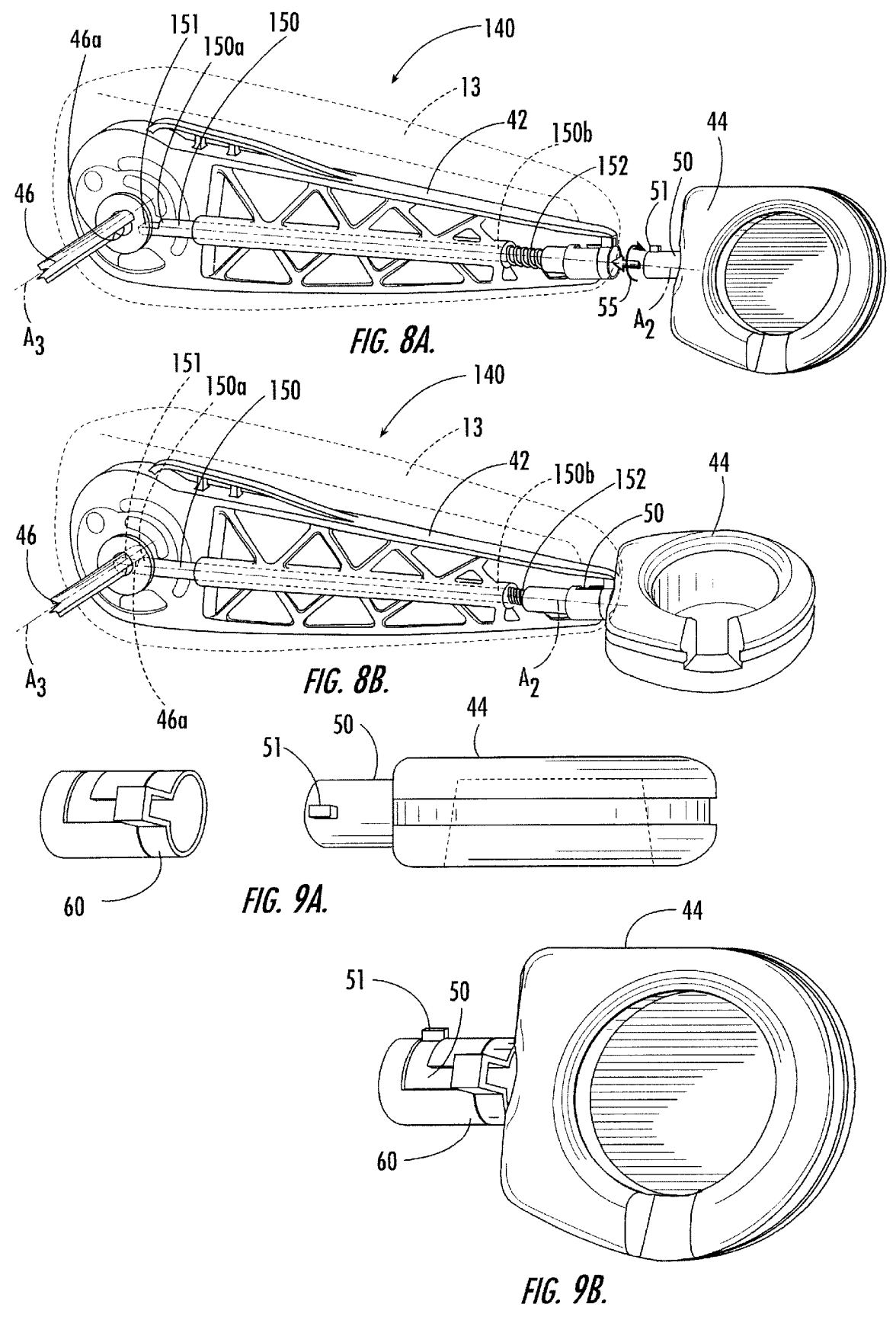

In the first position, the elongated member first end 150a does not engage the mounting pin (FIG. 8A); in the second position, the elongated member first end 150a engages the mounting pin slotted portion 46a (when the armrest 13 is in the lowered position) to prevent pivotal movement of the armrest 13 (FIG. 8B). A spring 152 is configured to urge the elongated member 150 to the first position when the beverage container holder 44 is not secured to the elongated frame 42. Insertion of the beverage container holder 44 into the armrest 13 causes the elongated arm 150 to move and engage the mounting pin 46, thereby preventing the armrest 13 from being moved to a raised position.

The first end 150a of the illustrated elongated member 150 has a slotted configuration that is configured to engage the mounting pin slotted portion 46a when the elongated member 150 is moved to the second position. The engagement of the mounting pin slotted portion 46a and the elongated member first end 150a prevents pivotal movement of the armrest 13. The elongated member 150 and the mounting pin 46 may have various configurations and may be configured to engage with each other in various ways to prevent pivotal movement of the armrest 13. The present invention is not limited to the illustrated embodiment.

A beverage container holder 44 is configured to be removably secured to an end portion of the elongated frame 42. The beverage container holder 44 engages the elongated member second end 150b and causes the elongated member 150 to move from the first position (unengaged) to the second position (engaged) when removably secured to the elongated frame 42, thereby preventing the armrest 13 frame from moving from a lowered position to a raised position.

The beverage container holder 44 includes a male connector 50 having a generally bayonet-shaped configuration with a member 51 extending radially outward from a distal end 50a of the male member 50. The frame 42 has a female connector 52 formed in the end 42a thereof that is configured to removably receive the male connector 50 in locking relationship, as described above. The illustrated female connector 52 has a generally keyhole-shaped configuration. The female connector 52 is configured to allow the male connector 50 to be rotated about an axis $A_2$ thereof to a locked position.

Figure 10:
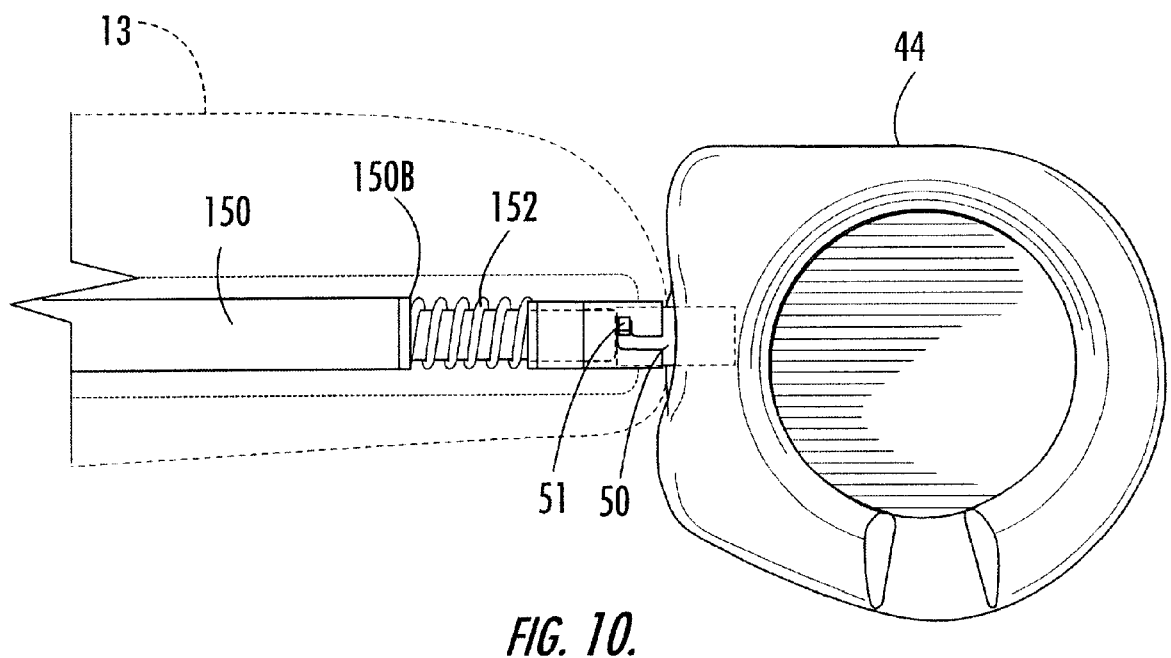
FIG. 10 is a top plan view of the armrest assembly of FIG. 8 illustrating the beverage container holder removably attached to the armrest.

FIGS. 9A–9B illustrate an internal sleeve 60 according to an embodiment of the present invention that is configured to receive the male member 50 and allow the male member 50 to rotate to a locked position. In FIG. 9A, the beverage container holder 44 is in a first orientation for insertion of the male member 50 into the female member 52. FIGS. 9B and 10 illustrate the beverage container holder 44 locked into place upon rotating he beverage container holder 44 about axis $A_2$ after insertion of the male member 50 into the female member 52.

The present invention is not limited to the illustrated embodiments. Armrests may be configured to receive various types of beverage container holders and in various locations. For example, an armrest assembly according to embodiments of the present invention may be configured such that a beverage container holder removably secured to an intermediate portion of an armrest restrains movement of the armrest when so engaged.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An armrest assembly, comprising:
   an elongated frame that is configured to be pivotally secured within a vehicle compartment and movable between a raised position and a lowered position; and
   a beverage container holder configured to be removably secured to one of an end portion of the frame and an intermediate portion of the frame, wherein the beverage container holder is configured to prevent movement of the elongated frame from the lowered position to the raised position when removably secured to the frame.

2. The armrest assembly of claim 1, wherein the beverage container holder comprises a male connector, and wherein the frame comprises a female connector configured to removably receive the male connector therein.

3. The armrest assembly of claim 2, wherein the male connector has a generally bayonet-shaped configuration, and wherein the female connector has a generally keyhole-shaped configuration that receives the male connector therein and allows the male connector to be rotated about an axis thereof to a locked position.

4. An armrest assembly, comprising:
   an elongated frame configured to be pivotally secured to a seat via a mounting pin that extends from the elongated frame, wherein the elongated frame is configured to pivot between raised and lowered positions relative to the seat;
   an elongated member comprising opposite first and second ends movably secured to the elongated frame, wherein the elongated member is configured to move between first and second positions, wherein the elongated member first end engages the mounting pin when the elongated member is in the second position and when the elongated frame is in the lowered position such that the elongated frame is restrained from pivotal movement; and
   a beverage container holder configured to be removably secured to the frame, wherein the beverage container holder engages the elongated member second end and causes the elongated member to move from the first position to the second position when removably secured to the elongated frame, thereby preventing the elongated frame from pivoting from a lowered position to a raised position.

5. The armrest assembly of claim 4, further comprising a biasing member that is configured to urge the elongated member to the first position when the beverage container holder is not secured to the elongated frame.

6. The armrest assembly of claim 4, wherein the beverage container holder is configured to be removably secured to an end portion of the elongated frame.

7. The armrest assembly of claim 4, wherein the beverage container holder is configured to be removably secured to an intermediate portion of the elongated frame.

8. The armrest assembly of claim 4, wherein the beverage container holder comprises a male connector, and wherein the frame comprises a female connector configured to removably receive the male connector therein.

9. The armrest assembly of claim 8, wherein the male connector has a generally bayonet-shaped configuration, and wherein the female connector has a generally keyhole-shaped configuration that receives the male connector therein and allows the male connector to be rotated about an axis thereof to a locked position.

10. A vehicle, comprising:
    a passenger compartment; and
    an armrest assembly, comprising:
       an elongated frame that is configured to be pivotally secured within a vehicle compartment and movable between a raised position and a lowered position; and
       a beverage container holder configured to be removably secured to one of an end portion of the frame and an intermediate portion of the frame, wherein the beverage container holder is configured to prevent movement of the elongated frame from the lowered position to the raised position when removably secured to the frame.

11. The vehicle of claim 10, wherein the beverage container holder comprises a male connector, and wherein the frame comprises a female connector configured to removably receive the male connector therein.

12. The vehicle of claim 11, wherein the male connector has a generally bayonet-shaped configuration, and wherein the female connector has a generally keyhole-shaped configuration that receives the male connector therein and allows the male connector to be rotated about an axis thereof to a locked position.

13. A vehicle, comprising:
   a passenger compartment; and
   an armrest assembly, comprising:
      an elongated frame configured to be pivotally secured to a seat via a mounting pin that extends from the elongated frame, wherein the elongated frame is configured to pivot between raised and lowered positions relative to the seat;
      an elongated member comprising opposite first and second ends movably secured to the elongated frame, wherein the elongated member is configured to move between first and second positions, wherein the elongated member first end engages the mounting pin when the elongated member is in the second position and when the elongated frame is in the lowered position such that the elongated frame is restrained from pivotal movement; and
      a beverage container holder configured to be removably secured to the frame, wherein the beverage container holder engages the elongated member second end and causes the elongated member to move from the first position to the second position when removably secured to the elongated frame, thereby preventing the elongated frame from pivoting from a lowered position to a raised position.

14. The vehicle of claim 13, further comprising a biasing member that is configured to urge the elongated member to the first position when the beverage container holder is not secured to the elongated frame.

15. The vehicle of claim 13, wherein the beverage container holder is configured to be removably secured to an end portion of the elongated frame.

16. The vehicle of claim 13, wherein the beverage container holder is configured to be removably secured to an intermediate portion of the elongated frame.

17. The vehicle of claim 13, wherein the beverage container holder comprises a male connector, and wherein the frame comprises a female connector configured to removably receive the male connector therein.

18. The vehicle of claim 17, wherein the male connector has a generally bayonet-shaped configuration, and wherein the female connector has a generally keyhole-shaped configuration that receives the male connector therein and allows the male connector to be rotated about an axis thereof to a locked position.

* * * * *